(12) United States Patent
Palani et al.

(10) Patent No.: US 12,238,532 B2
(45) Date of Patent: Feb. 25, 2025

(54) DEPLOYING NETWORKED EQUIPMENT BASED ON A DEPLOYMENT MODEL

(71) Applicant: Dell Products, L.P., Round Rock, TX (US)

(72) Inventors: Ashok Palani, Leander, TX (US); Hanna Yehuda, Acton, MA (US); Nicole Reineke, Northborough, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 575 days.

(21) Appl. No.: 17/576,858

(22) Filed: Jan. 14, 2022

(65) Prior Publication Data

US 2023/0232245 A1    Jul. 20, 2023

(51) Int. Cl.
*H04W 16/18* (2009.01)
*H04W 4/02* (2018.01)
*H04W 48/16* (2009.01)

(52) U.S. Cl.
CPC ........... *H04W 16/18* (2013.01); *H04W 4/025* (2013.01); *H04W 48/16* (2013.01)

(58) Field of Classification Search
CPC ...... H04W 16/18; H04W 4/025; H04W 48/16
See application file for complete search history.

(56) References Cited

U.S. PATENT DOCUMENTS

| | | | |
|---|---|---|---|
| 2002/0052941 A1* | 5/2002 | Patterson | H04L 41/22 709/222 |
| 2005/0203756 A1* | 9/2005 | Pirich, Jr. | G06Q 10/083 709/222 |
| 2013/0097317 A1* | 4/2013 | Sheleheda | H04W 12/088 709/225 |

* cited by examiner

*Primary Examiner* — Kiet Tang
(74) *Attorney, Agent, or Firm* — Amin, Turocy & Watson, LLP

(57) ABSTRACT

The technologies described herein are generally directed toward deploying networked equipment based on a selected deployment model. According to an embodiment, a system can comprise a processor and a memory that can enable performance of operations including receiving a deployment request from a request source, for a deployment task comprising networked equipment to be deployed and a location for deployment of the networked equipment. The operations can further include querying a data source for deployment information implicating the location and the deployment task. Based on the request source, the deployment task, and the deployment information, the operations include selecting a deployment model to facilitate processing the deployment request. The operations additionally include, based on the deployment task and the deployment model, deploying the networked equipment at the location.

20 Claims, 10 Drawing Sheets

DEPLOYING NETWORKED EQUIPMENT BASED ON A DEPLOYMENT MODEL

BACKGROUND

Networked computer equipment can comprise a plurality of computers that have different deployment requirements.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can include a processor and a memory that stores executable instructions that, when executed by the processor, facilitate performance of operations. The operations can include sending, to installation equipment, an installation request for installation of equipment at a geographic location. The operations can further include receiving, from the installation equipment, a confirmation that the equipment has been installed at the geographic location, wherein, based on the geographic location and the installation request, the installation equipment queried an information source for installation information implicating the geographic location and the equipment, with the equipment being installed based on an installation model selected based on the installation request, and the requesting equipment.

An example method can comprise receiving, by deployment equipment comprising a processor, a deployment request from a request source, for a deployment task comprising networked equipment to be deployed and a location for deployment of the networked equipment. The example method can further comprise, querying, by the deployment equipment, a data source for deployment information implicating the location and the deployment task. The example method can further comprise, based on the request source, the deployment task, and the deployment information, selecting, by the deployment equipment, a deployment model to facilitate processing the deployment request. The example method can additionally comprise, based on the deployment task and the deployment model, facilitating, by the deployment equipment, deploying the networked equipment at the location.

An example non-transitory computer-readable medium can comprise instructions that, in response to execution, cause a system comprising a processor to perform operations. These operations can comprise receiving a deployment request from a second network device, for a deployment task comprising networked equipment and a location for deployment. These operations can further comprise querying a third network device for information relating to the location and the deployment task. In addition, these operations can comprise, based on the second network device, the deployment task, and the information, selecting a deployment model to facilitate processing the deployment request. Additional operations can comprise, based on the deployment task and the deployment model, deploying the networked equipment.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Generally speaking, one or more embodiments described herein can facilitate deploying networked equipment based on a selected deployment model. By aggregating different data sources, historic deployment data, and analysis of deployments at other locations, one or more embodiments improve deployment times, increase reliability, and additional deployments of networked equipment. Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
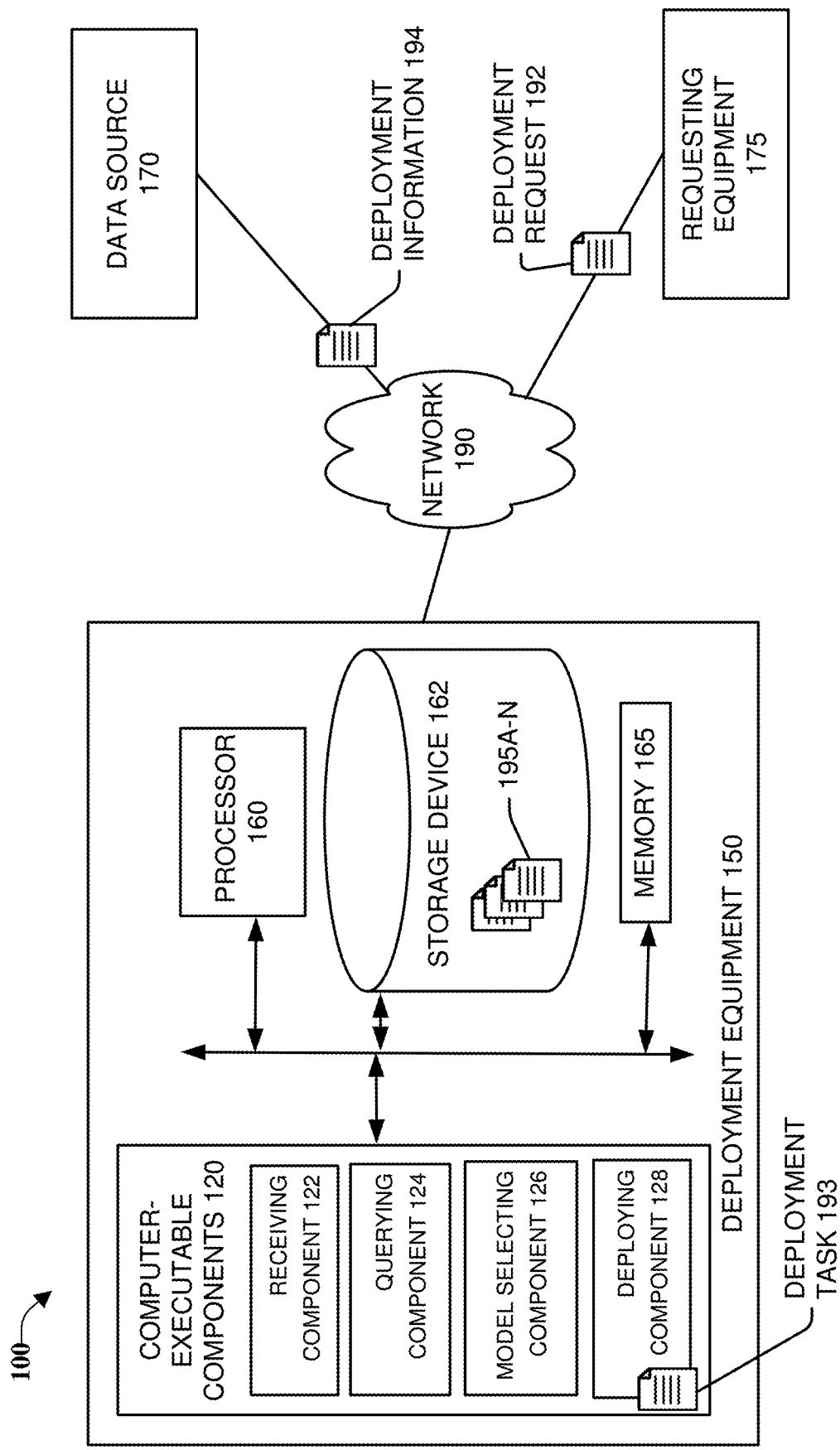
FIG. 1 is an architecture diagram of an example system that can facilitate deploying networked equipment based on a deployment model, in accordance with one or more embodiments.

FIG. 1 is an architecture diagram of an example system 100 that can facilitate deploying networked equipment based on a deployment model, in accordance with one or more embodiments. For purposes of brevity, description of like elements and/or processes employed in other embodiments is omitted. As depicted, system 100 includes deployment equipment 150 connected to data source 170 and requesting equipment 175 via network 190. As depicted, in one or more embodiments, via network 190, requesting equipment 175 can generate deployment request 192 and data source 170 can provide deployment information 194. Storage device 162 can include deployment models 195A-N, e.g., storage device 162 can be a deployment model repository, with deployment models 195A-N being able to be stored and accessed from any other storage location.

According to multiple embodiments, deployment equipment 150 can include memory 165 that can store one or more computer and/or machine readable, writable, and/or executable components 120 and/or instructions. In embodiments, deployment equipment 150 can include processor 160 and storage device 162. In one or more embodiments, computer-executable components 120, when executed by processor 160, can facilitate performance of operations defined by the executable component(s) and/or instruction(s). Computer executable components 120 can include receiving component 122, querying component 124, model selecting component 126, deploying component 128 with deployment task 193, and other components described or suggested by different embodiments described herein, that can improve the operation of system 100.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

As discussed further with FIG. 10 below, network 190 can employ various wired and wireless networking technologies. For example, embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3× (5G Option 3×), high speed packet access (HSPA), Z-Wave, Zigbee and other 802.XX wireless technologies and/or legacy telecommunication technologies.

In one or more embodiments, memory 165 can store computer and/or machine readable, writable, and/or executable components 120 and/or instructions that, when executed by processor 160, can facilitate execution of the various functions described herein relating to receiving component 122, querying component 124, model selecting component 126, deploying component 128 with deployment task 193, as well as other components to implement and provide functions to system 100, and some other embodiments described herein. network interface component, which can in some implementations facilitate receiving a first request from second networked equipment, to communicate a first communication to a destination group of user equipment via a first multi-cast connection to the destination group of user equipment.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of receiving component 122, which can in some implementations, can receive a deployment request from a request source, for a deployment task that includes the deployment of specified networked equipment and a location for deployment of the networked equipment. As discussed with FIGS. 3-5 below, one or more embodiments can receive deployment request 192 from requesting equipment 175, for deployment task 193 that can include the deployment of specified networked equipment at a selected location. Discussion of additional computer executable components 120 continues with FIG. 2 below.

It is understood that the computer processing systems, computer-implemented methods, apparatus and/or computer program products described herein employ hardware and/or software to solve problems that are highly technical in nature (e.g., rapidly evaluating criteria, and allocating resources for deployment in different contexts), that are not abstract and cannot be performed as a set of mental acts by a human. For example, a human, or even a plurality of humans, cannot efficiently generate or select complex deployment models based on internal, external, and historical data with the same level of accuracy and/or efficiency as the various embodiments described herein.

It is appreciated that the embodiments of the subject disclosure depicted in various figures disclosed herein are for illustration only, and as such, the architecture of such embodiments are not limited to the systems, devices, and/or components depicted therein. For example, in some embodiments, deployment equipment 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

Figure 2:
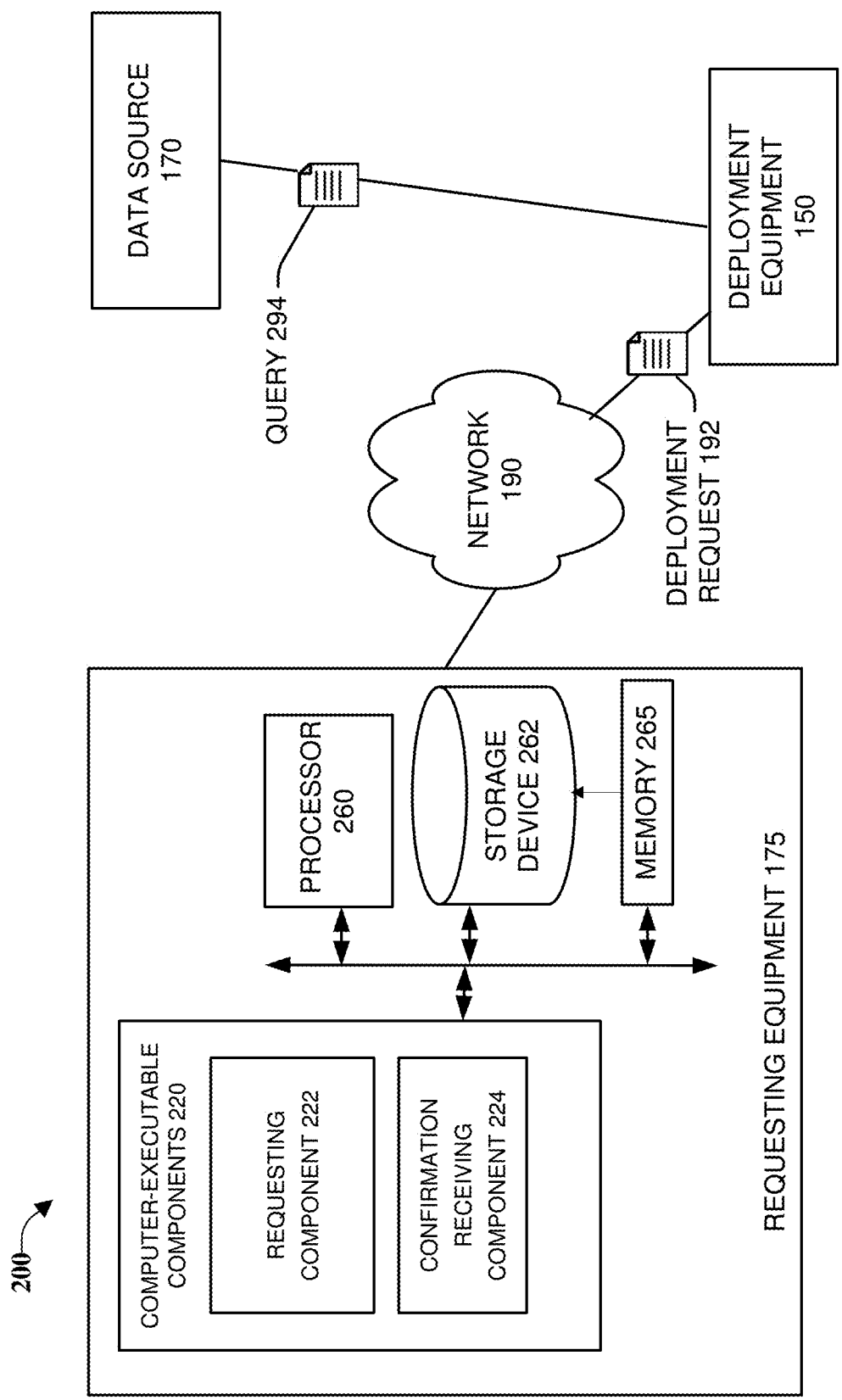
FIG. 2 is an architecture diagram of an example system that can facilitate deploying networked equipment based on a deployment model, in accordance with one or more embodiments.

FIG. 2 is an architecture diagram of an example system 200 that can facilitate deploying networked equipment based on a deployment model, in accordance with one or more embodiments. For purposes of brevity, description of like elements and/or processes employed in other embodiments is omitted. As depicted, system 200 includes requesting equipment 175 connected to data source 170 and deployment equipment 150 via network 190. As depicted, in one or more embodiments, via network 190, deployment equipment 150 can receive deployment request 192 and data source 170 can receive query 294. In embodiments, requesting equipment 175 can include processor 260 (similar to processor 160) and storage device 262, e.g., similar to storage device 162.

Example types of requesting equipment 175 can include, but are not limited to, financial services equipment, healthcare and pharmaceutical equipment, intelligent connected vehicle (ICV) equipment, and telecommunications systems equipment. One or more embodiments can provide deployment models that can seek to beneficially align deployment of equipment to the ecosystems, architectures, and outcomes of requesting equipment 175.

Deployment of financial services equipment use deployment models that include specifications for characteristics including but not limited to, data analytics and AI/ML, a software layer, multi-cloud and multi-tier topologies, end-user diversity, intelligent data management capabilities, and infrastructure modernization. Deployment of health care and pharmaceuticals equipment can use deployment models that include specifications for characteristics including but not limited to, data analytics, digital transformation, customer relationship management (CRM), business intelligence (BI), quality reporting and statistical analysis across a large population. In addition, health care and pharmaceuticals equipment can use models that enhance capacity to support capabilities including, but not limited to, telemedicine, virtual care and public health, clinical decision support, health information exchange (HIE), data interoperability, support for legacy systems, medical imaging, and digital pathology learning and diagnostics.

Deployment of ICV equipment can use deployment models that include specifications for characteristics including but not limited to, support for external ecosystems, manufacturing capacity, intelligent transport development of level 2 to level 5 (L2-L5) autonomous vehicle systems, safety and security, infotainment capacity, management of AI workloads, information management, inter-ICV communications, and simulations with AI/ML training datasets. Deployment of telecommunications systems equipment can use deployment models that include specifications for characteristics including but not limited to, enhanced mobile broadband (eMBB), massive machine type communications (mMTC), ultra-reliable and low latency communications (URLLC), dedicated edge hosting, edge infrastructure as a service (IaaS), platform as a service (PaaS), network as a service (NaaS), systems integration, and end-to-end consumer retail applications.

According to multiple embodiments, requesting equipment 175 can include memory 265 (similar to memory 165) that can store one or more computer and/or machine readable, writable, and/or executable components 220 and/or instructions that, when executed by processor 260, can facilitate performance of operations defined by the executable component(s) and/or instruction(s). According to multiple embodiments, memory 265 can store one or more computer and/or machine readable, writable, and/or executable components 220 and/or instructions, which can, when executed by processor 260, facilitate performance of operations defined by the executable component including requesting component 222, confirmation receiving component 224, and other components described or suggested by different embodiments described herein, that can improve the operation of system 200.

In one or more embodiments, computer executable components 220 can be used in connection with implementing one or more of the systems, devices, components, and/or computer-implemented operations shown and described in connection with FIG. 2 or other figures disclosed herein. In an example implementation of requesting equipment 170, memory 265 can store executable instructions that can facilitate generation of requesting component 222, which in some implementations, can send, to installation equipment, an installation request for installation of equipment at a geographic location. As discussed with FIGS. 3-5 below, one or more embodiments can send to deployment equipment 150, deployment request 192, e.g., a request for installation of equipment at a geographic location.

Continuing this example implementation example, memory 265 can store executable instructions that can facilitate generation of confirmation receiving component 224, which in some implementations, can receive a confirmation that the equipment has been installed at the geographic location, wherein, based on the geographic location and deployment request 192, the installation equipment sent query 294 to data source 170 for installation information implicating the geographic location and the equipment, and wherein the equipment was installed based on an installation model selected based on the installation request, and the requesting equipment.

Returning to the example discussed with FIG. 1, memory 165 can further store executable instructions that can facilitate generation of querying component 124, which can in some implementations query a data source for deployment information implicating the location and the deployment task. As discussed with FIGS. 3-5 below, one or more embodiments can transmit query 294 to data source 170 for deployment information 174 implicating the location and the deployment task. Example data source 170 information can include, but is not limited to, intelligence to detect massive external events that can create new needs (e.g., weather and geopolitical events such as hurricanes and armed conflicts) and information corresponding to the monitoring of key influencers of the ecosystems of requesting equipment 175, e.g., websites that evaluate equipment and service capabilities.

In another example, memory 165 can further store executable instructions that can facilitate generation of model selecting component 126, which can in some implementations, based on the request source, the deployment task, and the deployment information, select a deployment model to facilitate processing the deployment request. For example, one or more embodiments can, based on deployment request 192 from requesting equipment 175, deployment task 193, and deployment information received based on query 294 to data source 170, select one or more deployment models 195A-N to facilitate processing deployment request 192. Additional details of the operation of example model selecting components are provided with the discussion of deployment model service 350 with FIG. 3 below.

Continuing this example, memory 165 can further store executable instructions that can facilitate generation of deploying component 128, which can in some implementations, based on the deployment task and the deployment model, facilitate deploying the networked equipment at the location. As discussed with FIGS. 3-5 below, one or more embodiments can, based on deployment task 193 and a selected one or more of deployment models 195A-N, facilitate deploying the networked equipment at the location from deployment request 192.

Some examples included herein describe the operation of one or more embodiments used for the deployment of networked equipment. It should be noted that networked equipment is equipment (e.g., one or multiple devices) that is part of a network, and as referenced by some examples herein, when such equipment is operating as part of such network, or otherwise enabling or supporting the network, it is network equipment.

Figure 3:
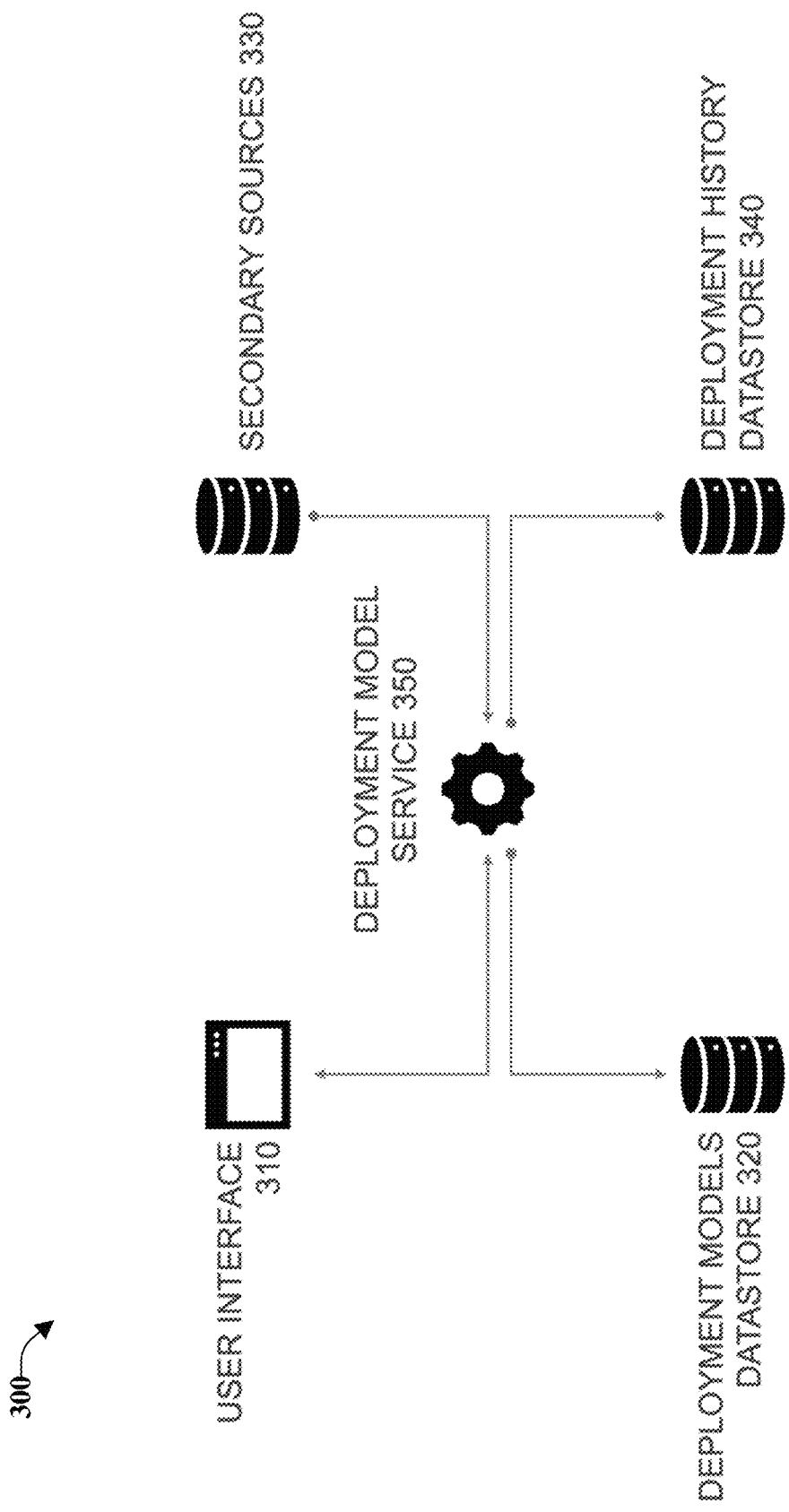
FIG. 3 is an architecture diagram of an example system that can facilitate deploying networked equipment based on a selected deployment model, in accordance with one or more embodiments.

FIG. 3 is an architecture diagram of an example system 300 that can facilitate deploying networked equipment based on a selected deployment model, in accordance with one or more embodiments. For purposes of brevity, description of like elements and/or processes employed in other embodiments is omitted. As depicted, system 300 includes deployment model service 350 coupled to user interface 310, deployment models datastore 320, secondary sources 330, and deployment history datastore 340. In one or more embodiments, deployment model service 350 can perform one or more of the operations of deployment equipment 150, e.g., integrating information from different data sources that facilitate selecting one or more of deployment models 195A-N.

One having skill in the relevant art(s), given the description herein, appreciate that the deployment models can include different broad approaches to allocating networked equipment to different locations, e.g., allocating equipment based on recurring deployment requests, models that facilitate leasing networked equipment to requesting equipment 175. In addition, networked equipment can be deployed and maintained using deployment models with allocation of services, e.g., latch-on deployment and direct acquisition of deployed equipment.

An example area where different deployment models can be combined is in a cloud computing environment. Example cloud-operating deployment models include, but are not limited to recurring deployment requests for public cloud implementations, transactional deployment requests for private cloud implementations, as well as combinations of deployment models for multi-cloud and edge cloud implementations.

In one or more embodiments, model selecting component 126 can generate a weighted list of potential deployment models 195A-N, e.g., using scores to gauge usefulness based on different criteria described and suggested by descriptions, herein. In one or more embodiments, receiving component 122 can receive deployment request 192 via user interface 310. In an example implementation, user interface 310 generate deployment requests 192 from value proposition requests, and receiving component 122 can receive deployment request 192 via an API feed.

In one or more embodiments, storage device 162 can provide deployment models datastore 320, with deployment models 195A-N stored for selection by model selecting component 126 of deployment service model 350. In some implementations, deployment models datastore 320 can include a detailed list of deployment models for products to be deployment, e.g., including value propositions by combinations of one or more product segments. Example value propositions can be mapped to different groups, including but not limited to market segments and industry verticals.

In one or more embodiments, querying component 124 can be used to collect information from secondary sources 330, e.g., data sources 170 discussed above with FIG. 2. In one or more embodiments, deployment history datastore 340 can be used as a source of prior deployments of requesting equipment 175 and other requesting equipment 175 with similar industry types and circumstances, e.g., the different types of requesting equipment 175 discussed with FIG. 2 above.

Figure 4:
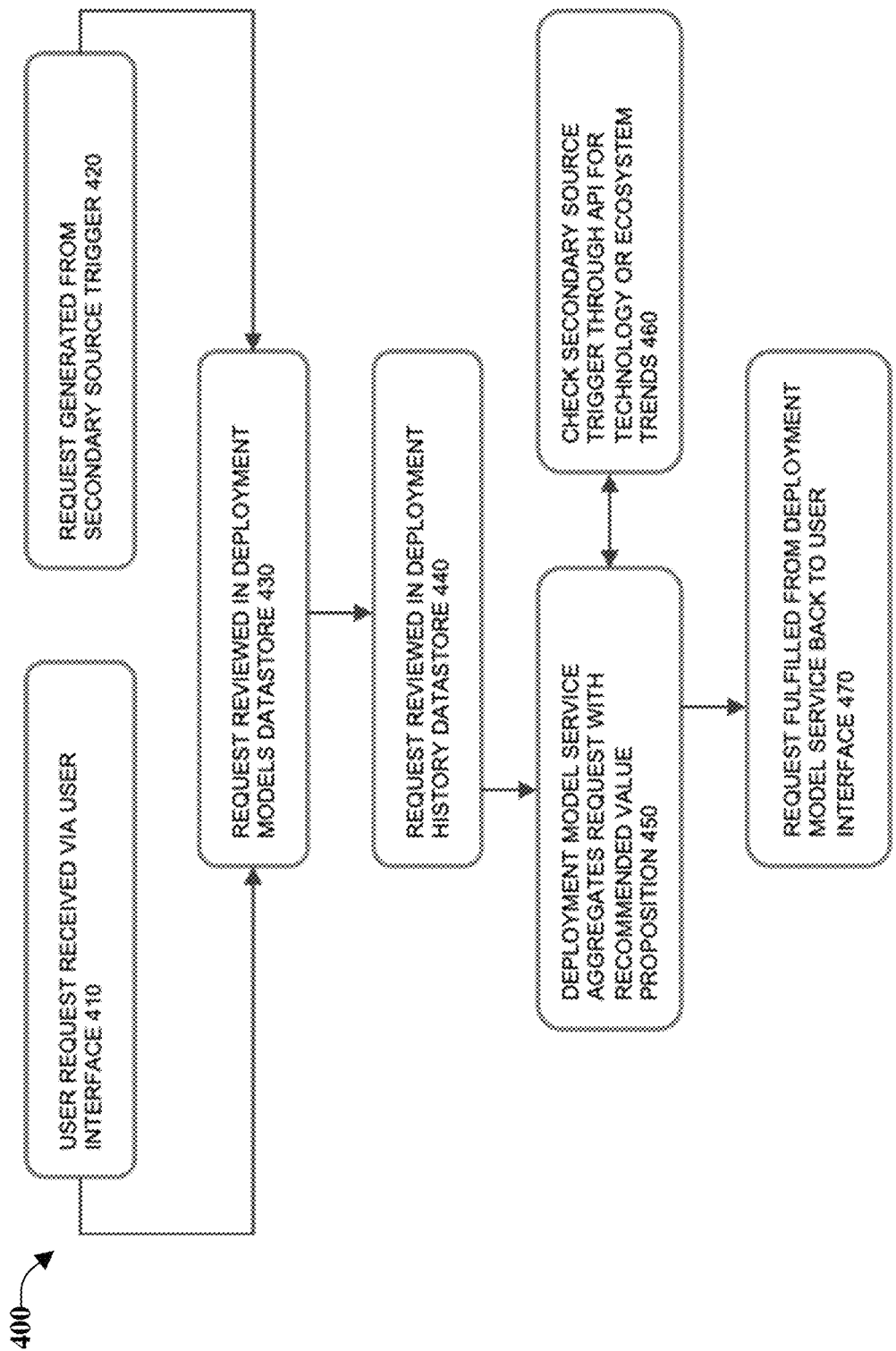
FIG. 4 and FIG. 5 depict flow diagrams of example approaches to implementation of different embodiments described herein.
Figure 5:
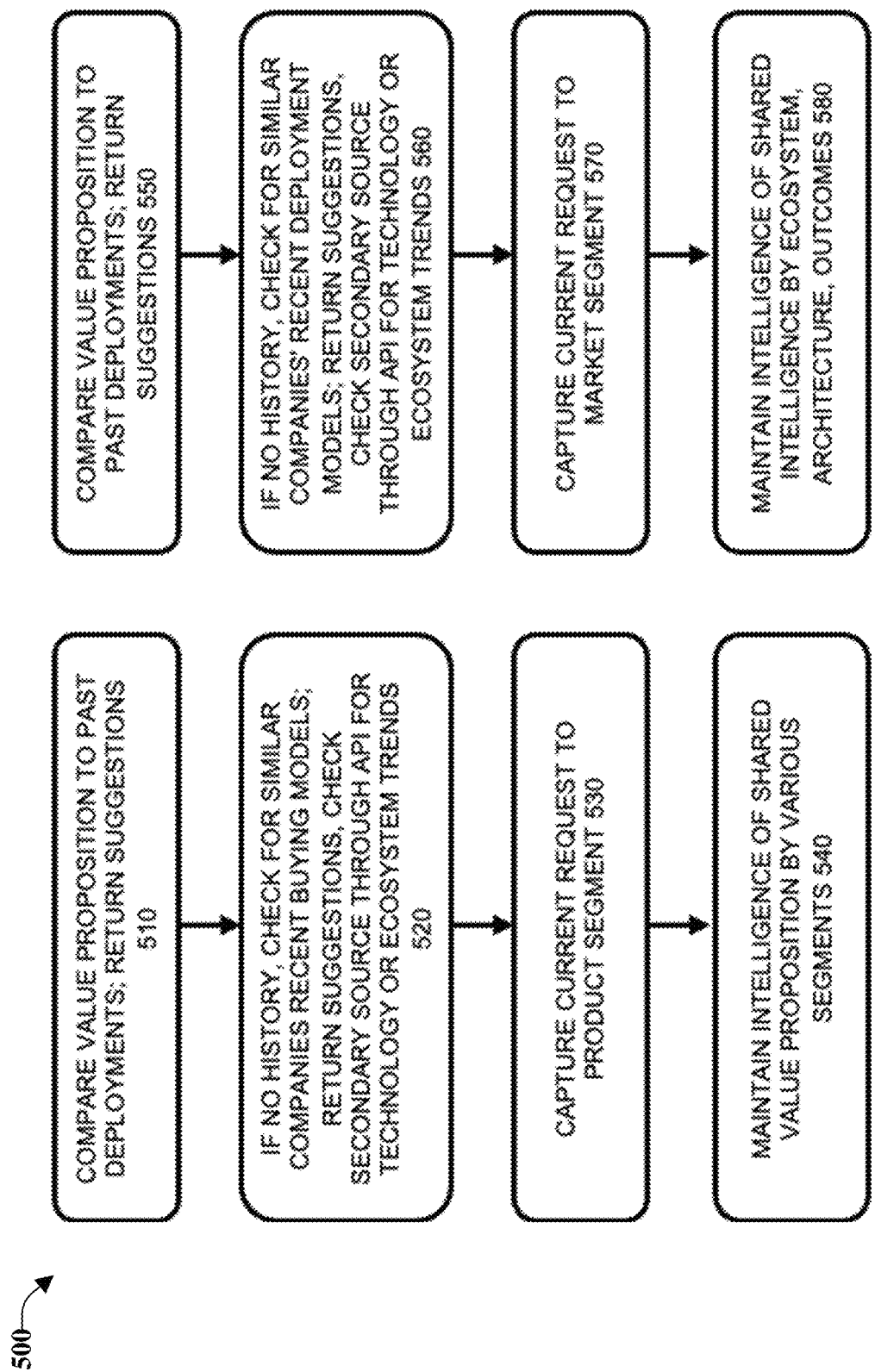

FIGS. 4 and 5 depict flow diagrams of example approaches to implementation of different embodiments described herein. For purposes of brevity, description of like elements and/or processes employed in other embodiments is omitted. FIGS. 4 and 5 are flow diagrams of respective example systems 400 and 500 that can facilitate deploying networked equipment based on a deployment model, in accordance with one or more embodiments.

At 410 of system 400, a user request can be received via user interface 410, e.g., from requesting equipment 175. Alternatively or additionally, at 420, a request can be generated from a secondary source trigger. In this example, a secondary source trigger can automatically generate deployment request 192 based on data from data source 170, such as deployment requests based on new needs cause by massive external events, e.g., as discussed with FIG. 2 above, weather and geopolitical events such as hurricanes and armed conflicts. Other data source 170 information that can trigger an automatic deployment request 192 and information corresponding to the monitoring of key influencers of the ecosystems of requesting equipment 175, e.g., websites that evaluate equipment and service capabilities.

At 430, deployment request 192 can be used to review existing deployment models 195A-N, e.g., how requesting equipment 175 corresponds to the different business models of deployment models 195A-N. In one or more embodiments, a business model can describe the rationale of how an organization associated with requesting equipment 175 can create, deliver and capture value, e.g., business models can determine how deployed equipment can generate a revenue stream, and how the revenue from the revenue is recognized, including for tax purposes.

At 440, a request can be reviewed in deployment history datastore 340, and at 450, deployment model service 350 can aggregate the request with a selected value proposition for requesting equipment 175. At 510, the selected value proposition can be compared to past deployments. At 520, if no history relevant to deployment request 192 is found, at 460, secondary source triggers can be checked for information from data source 170, e.g., data corresponding to significant events, and technology or ecosystem trends.

At 470, deployment request 192 can be fulfilled by deployment model service 350, e.g., via deploying component 128. At 530, deployment request 192 can be related to product segment, and at 540, value propositions shared by various segments can be evaluated. At 550, a value proposition associated with requesting equipment 175 can be compared to past deployments, and if no history of similar deployments for requesting equipment 175 is determined, at 560 deployment models for similar requesting equipment 175 can be analyzed. At 570, deployment request 192 can be linked to a market segment, and at 580, shared intelligence can be evaluated by ecosystems, architectures, and outcomes.

Figure 6:
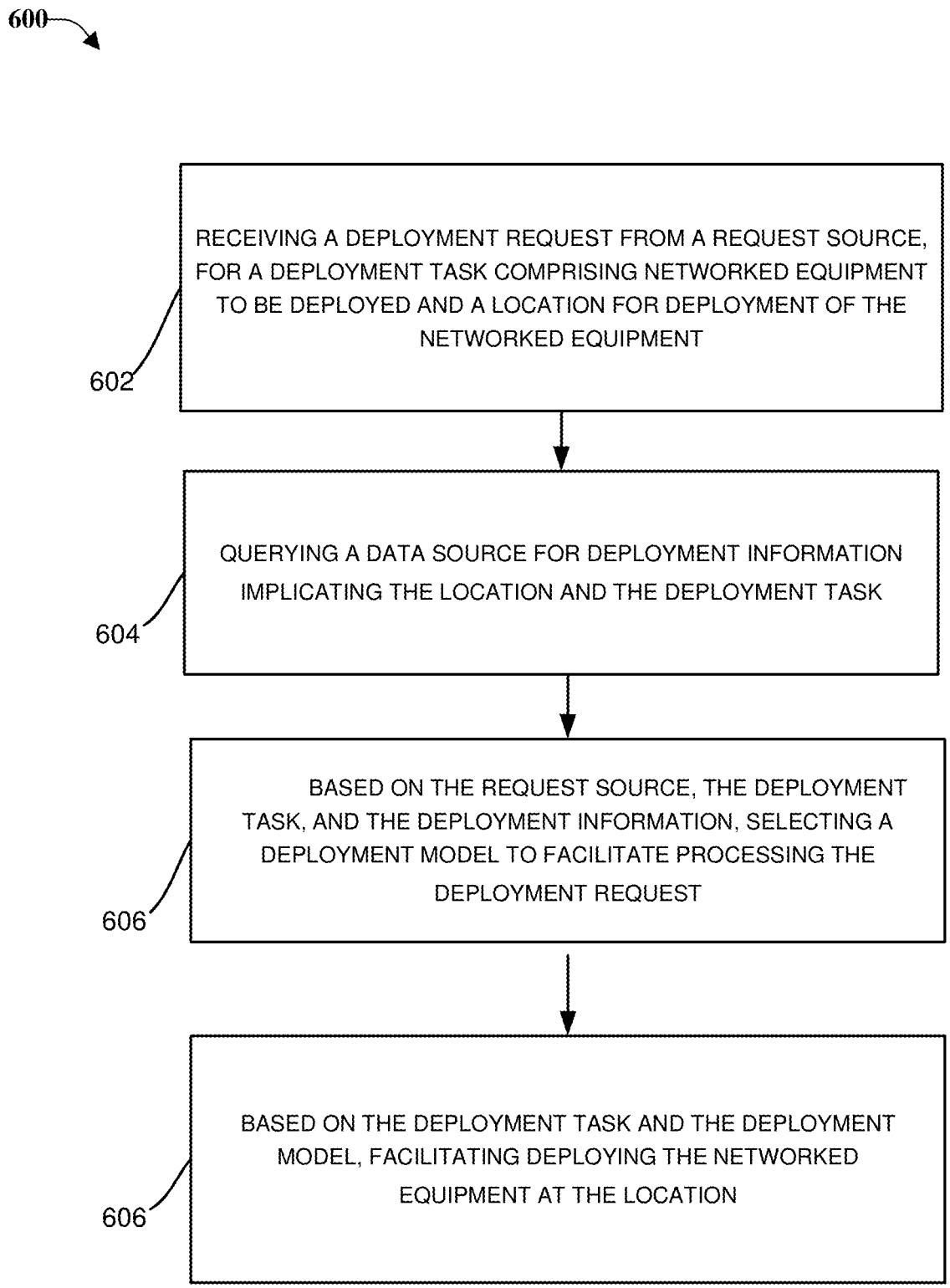
FIG. 6 depicts a flow diagram representing example operations of an example method that can facilitate deploying networked equipment based on a deployment model.

FIG. 6 depicts a flow diagram representing example operations of an example method 600 that can facilitate deploying networked equipment based on a deployment model. For purposes of brevity, description of like elements and/or processes employed in other embodiments is omitted.

In some examples, one or more embodiments of method 600 can be implemented by receiving component 122, querying component 124, model selecting component 126, deploying component 128, and other components that can be used to implement aspects of method 600, in accordance with one or more embodiments. It is appreciated that the operating procedures of method 600 are example operating procedures, and that there can be embodiments that implement more or fewer operating procedures than are depicted, or that implement the depicted operating procedures in a different order than as depicted.

At 602 of method 600, receiving component 122 can receive a deployment request from a request source, for a deployment task comprising networked equipment to be deployed and a location for deployment of the networked equipment. At 604 of method 600, querying component 124 can query a data source for deployment information implicating the location and the deployment task. At 606 of method 600, model selecting component 126 can, based on the request source, the deployment task, and the deployment information, select a deployment model to facilitate processing the deployment request. At 608 of method 600, deploying component 128 can, based on the deployment task and the deployment model, facilitate deploying the networked equipment at the location.

Figure 7:
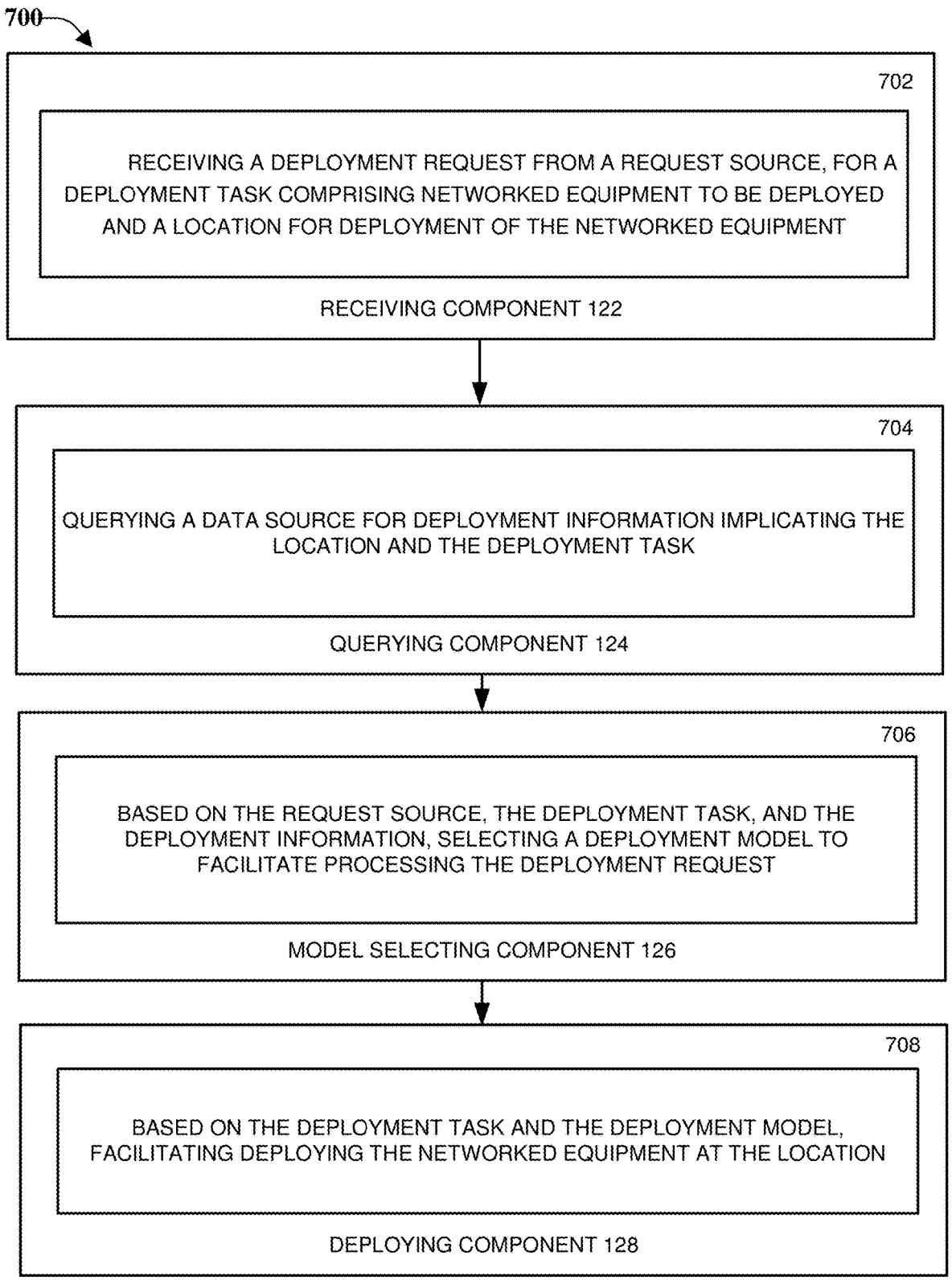
FIG. 7 depicts an example system that can facilitate deploying networked equipment based on a deployment model.

FIG. 7 depicts an example system 700 that can facilitate deploying networked equipment based on a deployment model. For purposes of brevity, description of like elements and/or processes employed in other embodiments is omitted. Example system 700 can include receiving component 122, querying component 124, model selecting component 126, deploying component 128, and other components that can be used to implement aspects of system 700, as described herein, in accordance with one or more embodiments.

At 702 of FIG. 7, receiving component 122 can receive a deployment request from a request source, for a deployment task comprising networked equipment to be deployed and a location for deployment of the networked equipment. At 704 of FIG. 7, querying component 124 can query a data source for deployment information implicating the location and the deployment task. At 706 of FIG. 7, model selecting component 126 can, based on the request source, the deployment task, and the deployment information, select a deployment model to facilitate processing the deployment request. At 708 of FIG. 7, deploying component 128 can, based on the deployment task and the deployment model, facilitate deploying the networked equipment at the location.

Figure 8:
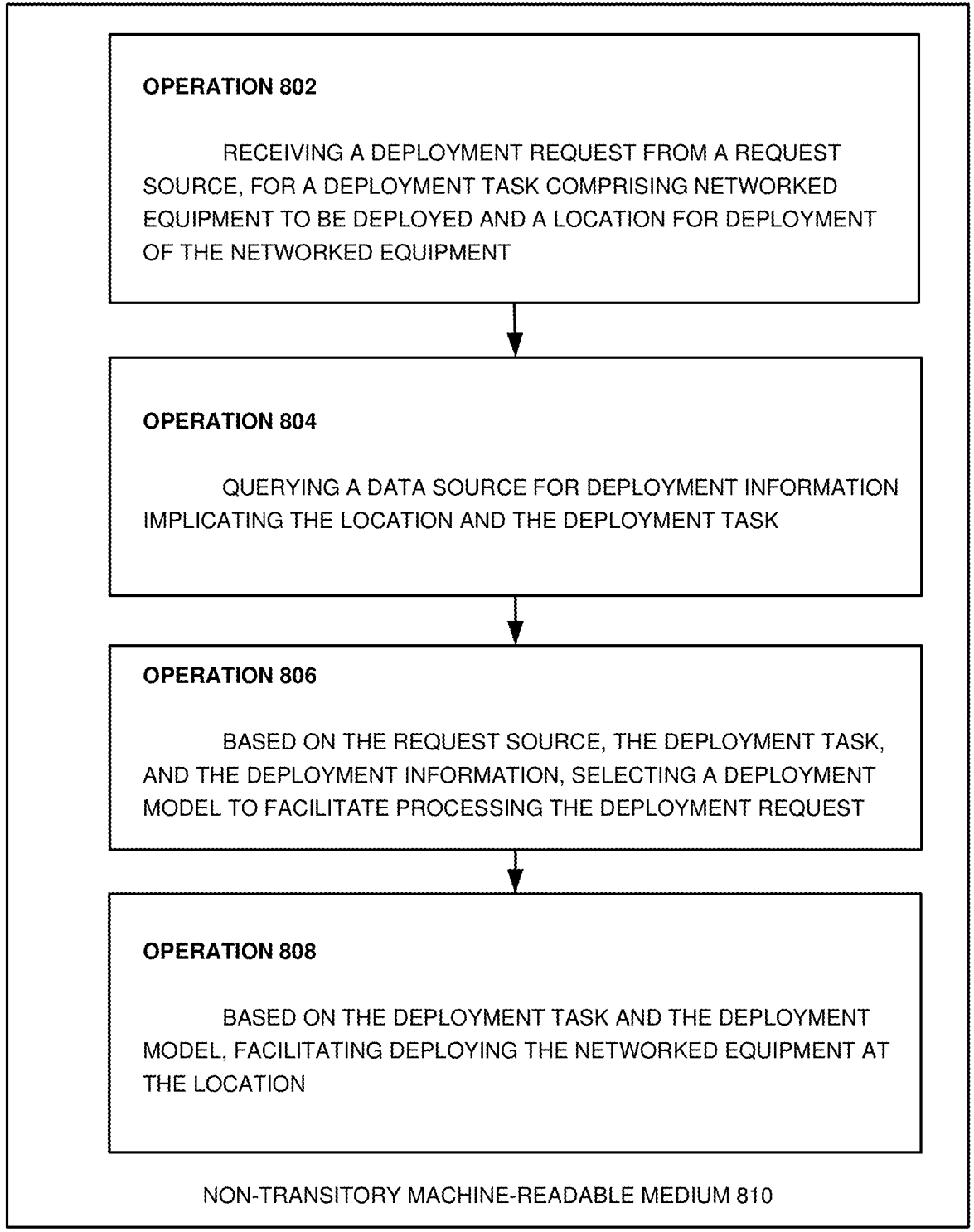
FIG. 8 depicts an example non-transitory machine-readable medium that can include executable instructions that, when executed by a processor of a system, facilitate deploying networked equipment based on a deployment model, in accordance with one or more embodiments.

FIG. 8 depicts an example 800 non-transitory machine-readable medium 810 that can include executable instructions that, when executed by a processor of a system, facilitate deploying networked equipment based on a deployment model, in accordance with one or more embodiments. For purposes of brevity, description of like elements and/or processes employed in other embodiments is omitted.

Operation 802 of FIG. 8 can cause receiving component 122 to receive a deployment request from a request source, for a deployment task comprising networked equipment to be deployed and a location for deployment of the networked equipment. Operation 804 of FIG. 8 can cause querying component 124 to query a data source for deployment information implicating the location and the deployment task. Operation 806 of FIG. 8 can cause model selecting component 126 to, based on the request source, the deployment task, and the deployment information, select a deployment model to facilitate processing the deployment request. Operation 808 of FIG. 8 can cause deploying component 128 to, based on the deployment task and the deployment model, facilitate deploying the networked equipment at the location.

Figure 9:
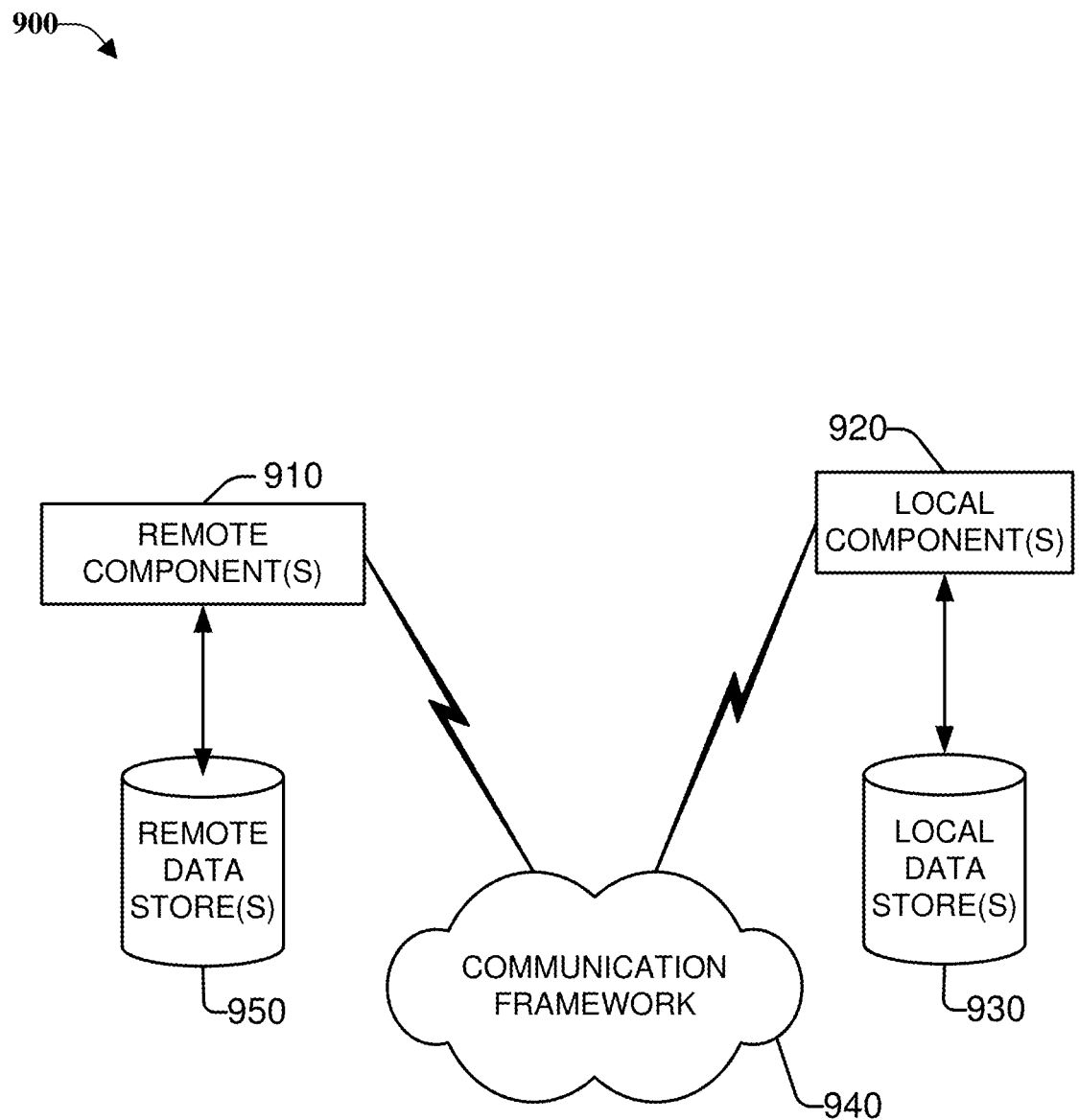
FIG. 9 depicts an example schematic block diagram of a computing environment with which the disclosed subject matter can interact.

FIG. 9 is a schematic block diagram of a system 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
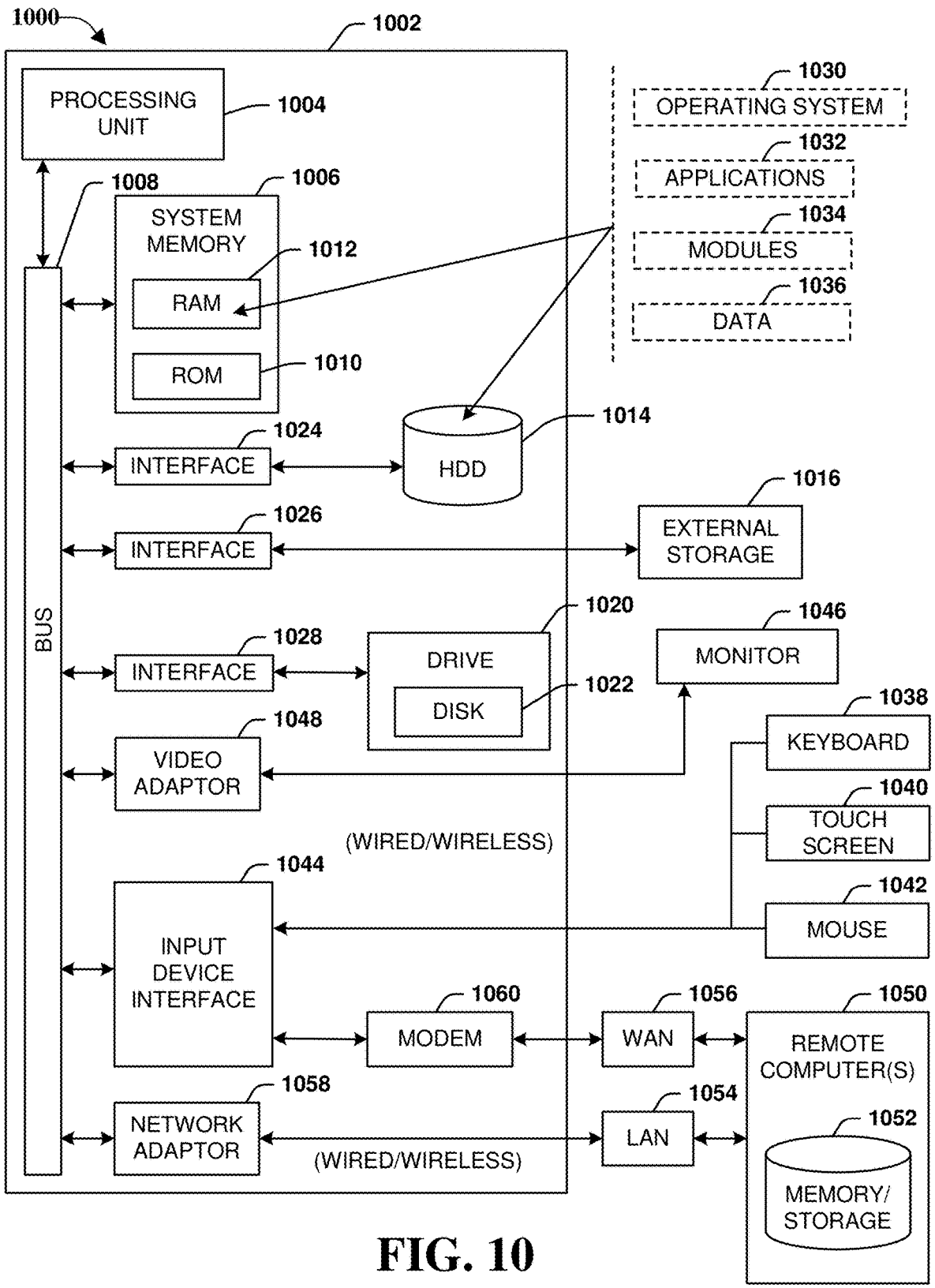
FIG. 10 illustrates an example block diagram of a computer operable to execute an embodiment of this disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/ communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any datastream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   receiving, by deployment equipment comprising one or more processors, a deployment request from a request source, for a deployment task comprising networked equipment to be deployed and a location for deployment of the networked equipment;
   querying, by the deployment equipment, a data source for deployment information implicating the location and the deployment task, wherein the data source comprises a source of current events that implicates the location, and wherein a current event of the current events comprises an event implicating international relations and the location;

based on the request source, the deployment task, and the deployment information, selecting, by the deployment equipment, a deployment model to facilitate processing the deployment request; and based on the deployment task and the deployment model, facilitating, by the deployment equipment, deploying the networked equipment at the location.

2. The method of claim 1, wherein the data source comprises a source of weather information for the location.

3. The method of claim 1, wherein the event further implicates provisioning, to the location, the networked equipment to be deployed.

4. The method of claim 1, wherein selecting the deployment model based on the request source comprises selecting the deployment model based on a previous deployment model previously deployed by the request source.

5. The method of claim 1, wherein selecting the deployment model is based on an estimate of usefulness of the deployment model for the deployment based on the deployment request.

6. The method of claim 5, wherein the usefulness is estimated based on a second deployment model previously deployed by the request source.

7. The method of claim 5, further comprising, generating, by the deployment equipment, a weighted list of potential deployment models, wherein weights of the weighted list are based on the estimate of usefulness of the respective deployment models.

8. The method of claim 1, wherein the event further implicates an armed conflict.

9. The method of claim 1, wherein the event further implicates the networked equipment.

10. The method of claim 1, wherein the deployment model is selected further based on the networked equipment.

11. The method of claim 10, wherein the deployment model is selected based on an estimated generation of revenue by the networked equipment.

12. The method of claim 1, further comprising, identifying, by the deployment equipment, a market segment associated with the deployment requests, wherein the selecting of the deployment model is further based on the market segment.

13. Requesting equipment, comprising:
at least one processor; and
at least one memory that stores executable instructions that, when executed by the at least one processor, facilitate performance of operations, comprising:
sending, to installation equipment, an installation request for installation of equipment at a geographic location, and
receiving, from the installation equipment, a confirmation that the equipment has been installed at the geographic location, wherein, based on the geographic location and the installation request, the installation equipment queried an information source for installation information implicating the geographic location and the equipment, and wherein the equipment was installed based on an installation model selected based on the installation request, and the requesting equipment, wherein the information source comprises a source of information corresponding to a first architecture of previously installed equipment at the geographic location, and wherein the information source comprises a source of current events that implicates the geographic location, and wherein a current event of the current events comprises an event implicating international relations.

14. The requesting equipment of claim 13, wherein the information source comprises a source of weather information for the geographic location.

15. The requesting equipment of claim 13, wherein the operations further comprise, selecting a second architecture for installation of the equipment based on the installation request.

16. The requesting equipment of claim 13, wherein selecting the installation model based on the requesting equipment comprises selecting the installation model based on a previous installation model previously used for deployment by the requesting equipment.

17. The requesting equipment of claim 13, wherein selecting the installation model is based on an estimate of applicability of the installation model for deployment based on the installation request.

18. The requesting equipment of claim 17, wherein the applicability is estimated based on a previous deployment model previously used for deployment by the requesting equipment.

19. A non-transitory machine-readable medium, comprising executable instructions that, when executed by at least one processor of a first network device, facilitate performance of operations, comprising:
receiving a deployment request from a second network device, for a deployment task comprising networked equipment and a location for deployment;
querying a third network device for information relating to the location and the deployment task, wherein the third network device comprises a source of current events that implicates the location for deployment, and wherein a current event of the current events comprises a weather event predicted for the location for deployment;
based on the second network device, the deployment task, and the information, selecting a deployment model to facilitate processing the deployment request; and
based on the deployment task and the deployment model, deploying the networked equipment.

20. The non-transitory machine-readable medium of claim 19, wherein selecting the deployment model based on the request source comprises selecting the deployment model based on a previous deployment model previously used for deployment for the second network device.

* * * * *